(12) United States Patent
Nguyen

(10) Patent No.: US 11,434,996 B2
(45) Date of Patent: Sep. 6, 2022

(54) SEAL PLUG

(71) Applicant: NYPROMOLD INC., Clinton, MA (US)

(72) Inventor: Tuan Nguyen, Clinton, MA (US)

(73) Assignee: NyproMold Inc., Clinton, MA (US)

(*) Notice: Subject to any disclaimer, the term of this patent is extended or adjusted under 35 U.S.C. 154(b) by 0 days.

(21) Appl. No.: 16/863,293

(22) Filed: Apr. 30, 2020

(65) Prior Publication Data

US 2021/0341057 A1 Nov. 4, 2021

(51) Int. Cl.
  *F16J 15/02* (2006.01)
  *B29C 45/73* (2006.01)
  *F16J 15/06* (2006.01)

(52) U.S. Cl.
  CPC ......... *F16J 15/022* (2013.01); *B29C 45/7312* (2013.01); *F16J 15/061* (2013.01); *F16J 15/062* (2013.01)

(58) Field of Classification Search
  CPC .... F16J 15/00; F16J 15/02; F16J 15/46; F16J 15/48; F16J 15/022; F16J 15/024; F16J 15/025; F16J 15/027; F16J 15/06; F16J 15/061; F16J 15/0831; F16J 15/062; B29C 45/00; B29C 45/72; B29C 45/73; B29C 45/7312; B29C 45/7318; B29C 45/7325; B29C 45/2642; B29C 45/2737
  USPC ........................................................ 277/637
  See application file for complete search history.

(56) References Cited

U.S. PATENT DOCUMENTS

| | | | | |
|---|---|---|---|---|
| 5,219,593 A | * | 6/1993 | Schmidt | B29C 45/27 264/328.15 |
| 5,291,842 A | * | 3/1994 | Sallstrom | A01C 23/026 111/127 |
| 6,283,156 B1 | | 9/2001 | Motley | |
| 6,386,545 B1 | * | 5/2002 | Evans | F16J 13/02 277/336 |

FOREIGN PATENT DOCUMENTS

| | | |
|---|---|---|
| CN | 207049847 U | 2/2018 |
| DE | 102014201887 | 8/2015 |
| JP | H0585608 | 11/1993 |

OTHER PUBLICATIONS

Extended European Search Report dated Aug. 10, 2021 From Corresponding European Patent Application No. 21171446.4.
"Apache Hose and Belting Inc 39006139 1/2" Male O-Ring Boss × 1/2" Female Pipe Swivel, 90 Degree Hydraulic Adapter"; https://www.walmart.com/ip/Apache-Hose-And-Belting-Inc-39006139-1-2-Male-O-Ring-Boss-x-1-2-Female-Pipe-Swivel-90-Degree-Hydraulic-Adapter/55408609; Visited Apr. 30, 2020.
"Hydraulic Hose Plug, Carbon Steel, Fitting Connection Type ORB, Fitting Size 1-1/4""; https://www.grainger.com/product/38YN82?gclid=EAIaIQobChMI9MaV6eXv5wIVx5-zCh0pFgdjEAQYASABEgLJVPD_BwE&cm_mmc=PPC:+Google+PLA&ef_id=EAIaIQobChMI9MaV6eXv5wIVx5-zCh0pFgdjEAQYASABEgLJVPD_BwE:G:s&s_kwcid=AL!2966!3!264955916078!!!g!438301707970!; Visited Apr. 30, 2020.

(Continued)

*Primary Examiner* — Nathan Cumar
(74) *Attorney, Agent, or Firm* — Duquette Law Group

(57) ABSTRACT

Embodiments of the innovation relate to a seal plug which includes a plug body having a first sealing portion and a second sealing portion, an o-ring disposed about an outer periphery of the first sealing portion, and a set of threads disposed about an outer periphery of the second sealing (Continued)

portion. The second sealing portion defines a tool engagement portion.

15 Claims, 5 Drawing Sheets

(56) References Cited

OTHER PUBLICATIONS

"Diversified Machine RRC-1010 Inspection Plug, 1-5/8-12 in Thread, 1 in Hex Head, 2 in OD, O-Ring Seal, Aluminum, Gold Anodize, DMI Bulldog CT-1 Center/ Side Bells"; https://www.raceplumbing.net/Diversified-Machine-RRC-1010-Inspection-Plug-1-58-12-in-Thread-1-in-Hex-Head-2-in-OD-O-Ring-Seal-Aluminum-Gold-Anodize-DMI-Bulldog-CT-1-CenterSide-Bells-Each_p_34398.html; Visited Apr. 30, 2020.

* cited by examiner

SEAL PLUG

BACKGROUND

Field

Embodiments of the innovation relate, generally, to a seal plug configured to create a fluid seal with a cooling channel of a cooling assembly and to maintain the seal to mitigate leakage of cooling fluid from the cooling channel during operation.

Description of the Background

Conventional injection molds are utilized to manufacture a variety of molded articles. For example, injection molds can be used to produce threaded molded articles, such as threaded plastic covers for bottles or other containers. Certain injection molds include a cooling assembly disposed in proximity to the molded articles. Following a molding procedure, a fluid, such as a coolant, can circulate through the cooling assembly to draw heat away from the molded articles. Such cooling can improve the quality of the final article prior to ejection from the injection mold. For example, in the case where the injection mold produces a relatively thick-walled part, such as a plastic lens, the cooling assembly can reduce the temperature of the part to mitigate shrinkage or deformation. Further, the use of a cooling assembly can accelerate the injection mold's cycle time. For example, by decreasing the temperature of the molded articles following a molding procedure, the cooling assembly can ensure that the articles are sufficiently solid to allow ejection from the injection mold as soon as possible without damage to the part. With such rapid ejection of the molded articles, the injection mold can perform a subsequent molding procedure without unnecessary lag time.

Typical cooling assemblies can be configured as a series of fluid channels formed within the injection mold housing and which surround the molded articles produced by the injection mold. These fluid channels can extend from the outer wall of the injection mold inwardly toward the mold portion of the injection mold. In order to seal the fluid channel openings in the outer wall and to maintain the cooling fluid within the injection mold, the cooling assemblies can utilize a variety of types of side sealing plugs In one example, certain cooling assemblies can include threadless o-ring plugs to seal the fluid channels. Threadless o-ring plugs typically include a plug body and an o-ring or gasket disposed about the outer periphery of the plug body. In use, following insertion of the threadless o-ring plug into a fluid channel, the o-ring forms a friction fit with the fluid channel wall to mitigate the flow of the cooling liquid to the outside of the injection mold.

In another example, certain cooling assemblies can include threaded pipe plugs to seal the fluid channels. The threaded pipe plugs typically include a plug body having a tapered set of threads. In use, as a manufacturer engages the threads of the threaded pipe plugs with threads formed into wall of the fluid channel, the threaded pipe plug forms a seal with the fluid channel to limit or prevent the flow of the cooling liquid to the outside of the injection mold.

SUMMARY

Conventional sealing plugs suffer from a variety of deficiencies. For example, as provided above, the threadless o-ring plug can form a friction fit with the corresponding fluid channel wall. However, in the case where the cooling assembly experiences a relatively high fluid pressure, this pressure can loosen or eject the plug from the fluid channel, thereby allowing cooling fluid to leak from the injection mold. With respect to the threaded pipe plug, during an installation process, an assembler typically advances the threaded pipe plug into the threads of the wall of the fluid channel. However, conventional threaded pipe plugs lack a mechanism to prevent overtightening relative to the fluid channel. As such, an assembler can overtighten the threaded pipe plug relative to the fluid channel which can lead to cracking of the threaded pipe plug, the fluid channel, or both, and allow cooling fluid to leak from the injection mold.

By contrast to conventional sealing plugs, embodiments of the present innovation relate to a seal plug, such as configured for use with a cooling assembly. For example, the seal plug includes collinearly arranged first and second sealing portions which, in combination, provide a substantially secure fluid seal which can withstand relatively large hydraulic pressures found in conventional cooling assemblies. Additionally, the seal plug is configured with a relatively low height profile which, when used as part of an injection mold, utilizes a minimal volume within the injection mold plates. As such, this configuration maximizes the volume available for injection mold cavities within the injection mold, thereby maximizing the number of molded parts which can be generated by the injection mold.

Certain embodiments of the innovation can relate to a seal plug which includes a plug body having a first sealing portion and a second sealing portion, an o-ring disposed about an outer periphery of the first sealing portion, and a set of threads disposed about an outer periphery of the second sealing portion. The second sealing portion defines a tool engagement portion.

Certain embodiments of the innovation can relate to an injection mold, comprising a first mold plate having a first set of mold elements; a second mold plate having a second set of mold elements, the second mold plate opposing the first mold plate; and a cooling assembly carried by at least one of the first mold plate and the second mold plate,. The cooling assembly comprises a fluid channel defined by the at least one first mold plate and second mold plate, and a seal plug disposed within the fluid channel. The seal plug comprises a plug body having a first sealing portion and a second sealing portion, an o-ring disposed about an outer periphery of the first sealing portion, and a set of threads disposed about an outer periphery of the second sealing portion, the second sealing portion defining a tool engagement portion.

Certain embodiments of the innovation can relate to a method for assembly of a cooling assembly, comprising inserting a seal plug into a fluid channel of a housing; advancing a first sealing portion of the seal plug into a first fluid channel portion of the fluid channel to engage an o-ring of the first sealing portion with a wall of the first fluid channel portion; and rotatably advancing a second sealing portion of the seal plug into a second fluid channel portion of the fluid channel to engage a plug stop of the first sealing portion with a seal plug seat of the first fluid channel portion.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

DETAILED DESCRIPTION

Embodiments of the present innovation relate to a seal plug, such as configured for use with a cooling assembly. For example, the seal plug includes collinearly arranged first and second sealing portions which, in combination, provide a substantially secure fluid seal which can withstand relatively large hydraulic pressures found in conventional cooling assemblies. Additionally, the seal plug is configured with a relatively low height profile which, when used as part of an injection mold, utilizes a minimal volume within the injection mold plates. As such, this configuration maximizes the volume available for injection mold cavities within the injection mold, thereby maximizing the number of molded parts which can be generated by the injection mold.

Figure 1:
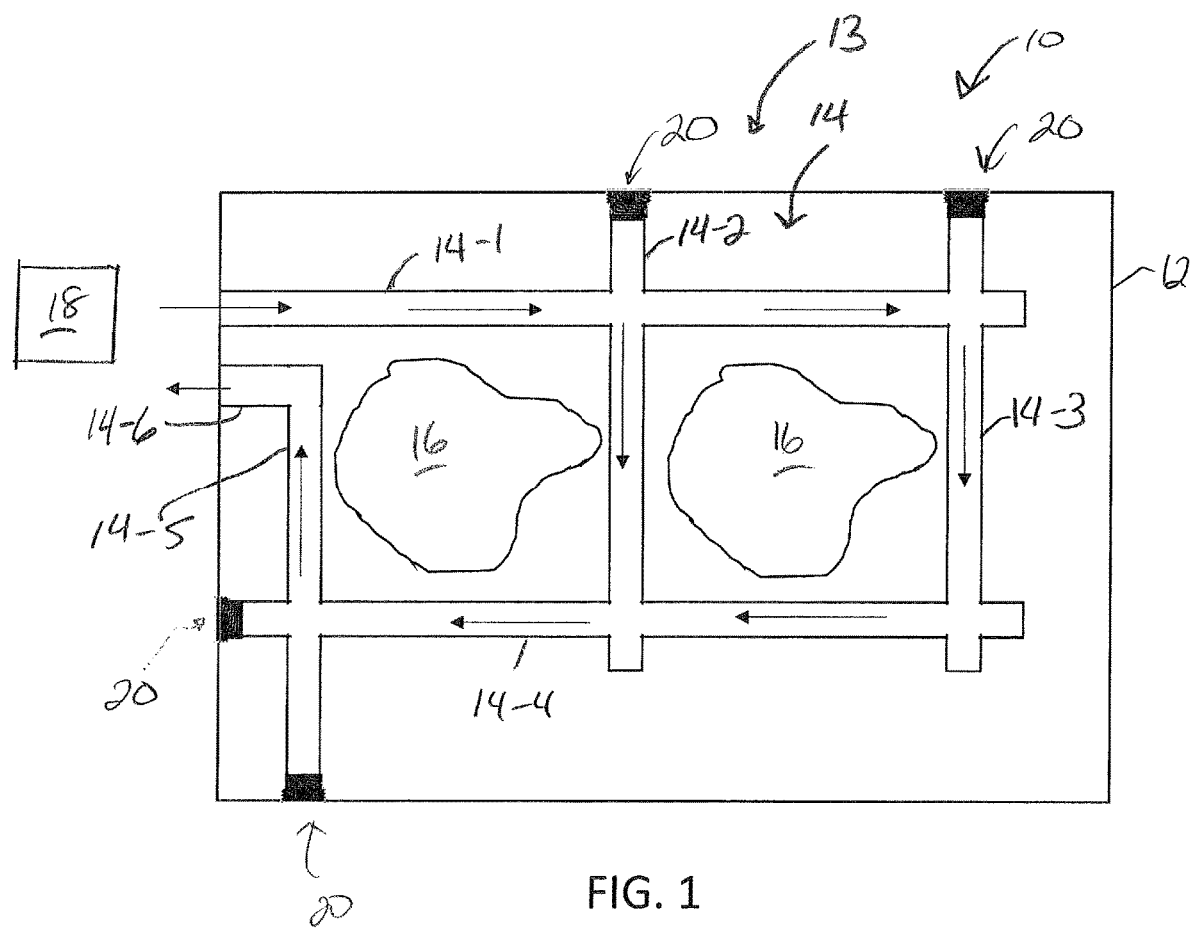
FIG. 1 illustrates a sectional view of a schematic representation of an injection mold having a cooling assembly, according to one arrangement.

FIG. 1 illustrates a sectional view of a schematic representation of an injection mold 10, according to one arrangement. The injection mold 10 includes a first mold plate or housing 12 having a first set of mold elements, such as threaded core molds, and a second mold plate or housing (not shown) having a corresponding second set of mold elements 20, such as cap cavities. At least one of the first and second mold plates includes a cooling assembly 13 configured to draw heat away from molded articles 16 formed by the injection mold 10 prior to ejection.

In one arrangement, the cooling assembly 13 includes a set of fluid channels 14 defined by at least one of the first and second mold plates and which surround the molded articles 16. For example, the set of fluid channels 14 can include an inlet channel 14-1, flow channels 14-2 through 14-5, and an outlet channel 14-6. The inlet channel 14-1 is configured to provide cooling fluid from a fluid reservoir 18 to the flow channels 14-2 through 14-5 of the injection mold 10. The circulation channels 14-2 through 14-5, in turn, are configured to direct the cooling fluid about the outer periphery of the molded articles 16 and toward the outlet channel 14-6 which delivers the cooling fluid back to the fluid reservoir 18.

During a fluid channel manufacturing process, a manufacturer can mill the fluid channels 14 into the first and second mold plates, such as illustrated in FIG. 1. As such, each of the fluid channels 14 extends from an outer wall of the injection mold 10 and into an end location within the mold plates. In order to maintain the cooling fluid within the set of fluid channels 14 while mitigating leakage from the injection mold 10, the cooling assembly 13 includes seal plugs 20 disposed within each of the fluid channels 14-2 through 14-5.

Figure 2:
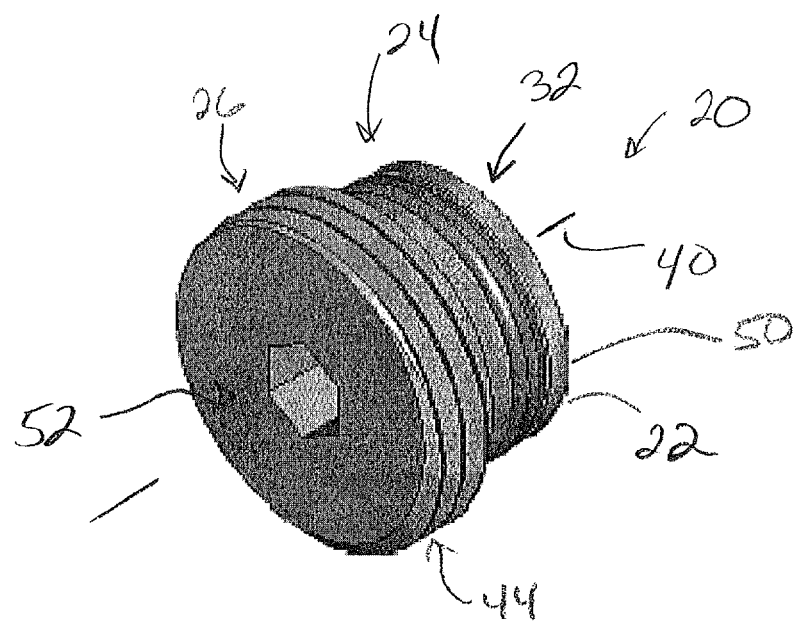
FIG. 2 illustrates a perspective view of a seal plug of the cooling assembly of FIG. 1, according to one arrangement.
Figure 3:
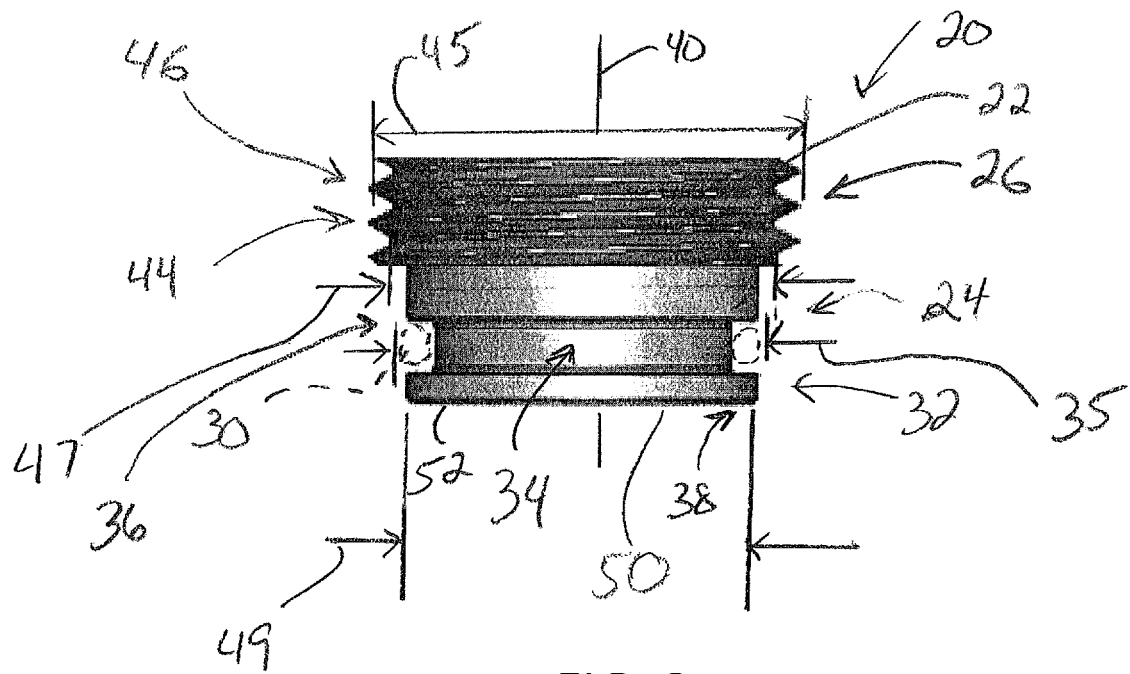
FIG. 3 illustrates a side view of the seal plug of FIG. 2, according to one arrangement.

FIGS. 2 and 3 illustrate a seal plug 20, according to one arrangement. As shown, the seal plug 20 includes a plug body 22 having a first sealing portion 24 and a second sealing portion 26. In one arrangement, the first and second sealing portions 24, 26 are integrally formed as part of the cylindrical plug body 22 with a longitudinal axis of the second sealing portion 26 being collinear with a longitudinal axis of the first sealing portion 24. With such a configuration, the seal plug 20 can provide a substantially secure fluid seal relative to a fluid channel 14.

Figure 5:
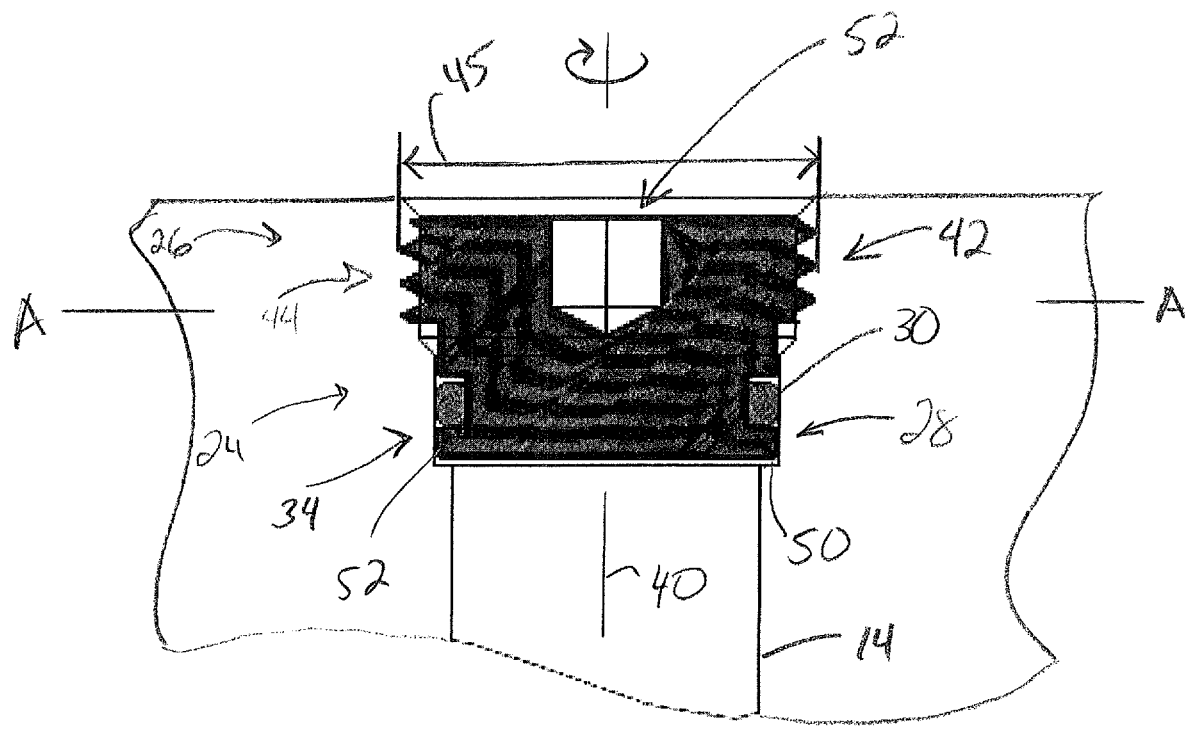
FIG. 5 illustrates a side sectional view of the seal plug of FIG. 2 disposed within a fluid channel of the cooling assembly, according to one arrangement.

The first sealing portion 24 is configured to form a fluid seal with the fluid channel 14. In one arrangement, the first sealing portion 24 of the seal plug 20 can provide a friction fit with a corresponding first fluid channel portion 28 of a fluid channel 14, as indicated in FIG. 5. For example, the first sealing portion 24 includes an o-ring 30 disposed about an outer periphery 32.

To maintain a longitudinal position of the o-ring 30 relative to the plug body 22, the first sealing portion 24 can define a channel 34 which extends about a circumference of the first sealing portion 24. In one arrangement, with specific reference to FIG. 3, the channel 34 can define first and second shoulders 36, 38. The shoulders 36, 38 are configured to maintain the longitudinal position of the o-ring 30 relative to the first sealing portion 24 and to mitigate translation of the o-ring 30 along a longitudinal axis 40 of the seal plug 20 during insertion within, or removal from, the first fluid channel portion 28 of a fluid channel 14.

For example, with specific reference to FIG. 3, in an uncompressed state, an outer diameter 35 of the o-ring 30 can extend beyond the first and second shoulders 36, 38 of the channel 34. As such, interaction between the shoulders 36, 38 and the o-ring 30 maintains the position of the o-ring 30 on the first sealing portion 24. With additional reference to FIG. 5, following insertion of the seal plug 20 within the first fluid channel portion 28 of a fluid channel 14, the walls of the first fluid channel portion 28 compresses the o-ring 30 within the channel 34 along a radial direction. This interaction provides a friction fit between the seal plug 20 and the fluid channel 14 and can mitigate the ability of the seal plug 20 to back out of the fluid channel 14 during operation, such as when the seal plug 20 experiences relatively high pressure from the cooling fluid contained within the fluid channel 14.

In one arrangement, interaction between the first sealing portion 24 and the fluid channel 14 can mitigate the ability for an assembler to over-tighten the seal plug 20 within the fluid channel 14. For example, with particular reference to FIG. 5, the first sealing portion 24 defines a plug stop 50 configured to interact with a seal plug seat 52 of the first fluid channel portion 28. With reference to FIG. 5, the plug stop 50 can be configured as a face of the first sealing portion 24 which is disposed substantially perpendicular to the longitudinal axis 40 of the seal plug 20. Further, the seal plug seat 52 of the first fluid channel portion 28 can be configured as a shoulder disposed between the first fluid channel portion 28 and the corresponding fluid channel 14. Accordingly, the interaction between the plug stop 50 and the seal plug seat 52 forms a positive stop for the seal plug 20 and mitigates over tightening of the seal plug 20 and potential damage to the seal plug 20 and/or the fluid channel 14.

The second sealing portion 26 is configured to secure the seal plug 20 to the fluid channel 14. For example, with reference to FIGS. 2, 3, and 5, the second sealing portion 26 defines a set of threads 44 disposed about its outer periphery 46. With particular reference to FIG. 5, the threads 44 of the second sealing portion 26 are configured to engage with corresponding threads defined by the second fluid channel portion 42. While the threads 44 can be configured in a variety of ways, in one arrangement, the threads 44 are configured as straight threads wherein a major diameter 45 of the threads 44 is substantially equal along a longitudinal axis 40 of the seal plug 20. During installation, as an assembler engages the threads 44 of the second sealing portion 26 with the threads of the second fluid channel portion 42, the straight thread configuration of the threads 44 limits over loading of either the second fluid channel portion 42 or the components disposed in proximity to the fluid channel 14. As such, the straight thread configuration can minimize or prevent damage to the injection mold.

In one arrangement, the second sealing portion 26 is configured to enhance the fluid seal formed by the first sealing portion 24. For example, as illustrated in FIGS. 2, 3, and 5, a major diameter 45 of the set of threads 44 of the second sealing portion 26 is greater than an outer diameter 49 of the first sealing portion 24. As such, with particular reference to FIG. 5, as an assembler inserts the seal plug 20 into a fluid channel 14, the first sealing portion 24 enters the second fluid channel portion 42 and advances into the first fluid channel portion 28. The assembler then engages the threads 44 of the second sealing portion 26 with the threads of the second fluid channel portion 42 and rotatably advances the second sealing portion 26 toward the first fluid channel portion 28. Once the seal plug 20 has been secured to the fluid channel 14, the o-ring 30 generates a radial force against the first fluid channel portion 28 to form a fluid seal. Further, because of the relative geometry of the major diameter 45 of the set of threads 44 and the outer diameter 49 of the first sealing portion 24, the second sealing portion 26 can generate a radial force against the second fluid channel portion 42 to maintain the position of the first sealing portion 24 within the first fluid channel portion. As such, the second sealing portion 26 minimizes the ability of high pressure cooling fluid contained within the fluid channel 14 from loosening or ejecting the seal plug 20 from the injection mold 10.

With continued reference to FIG. 3, in one arrangement, the relative diameter of the threads 44 and the outer diameter 35 of the o-ring 30 can mitigate damage to the o-ring 30 during installation. For example, as indicated in FIG. 3, each of the major diameter 45 of the threads 44 and a minor diameter 47 of the threads 44 is greater than the outer diameter 35 of the o-ring 30. With such a configuration, as an assembler inserts the first sealing portion 24 into the tapped second fluid channel portion 42, the relatively smaller outer diameter 35 of the o-ring 30 can provide limited, if any, contact between the o-ring 30 and the threads of the second fluid channel portion 42. As such, this can limit damage to the o-ring 30, such as caused by shearing, during installation.

Figure 4:
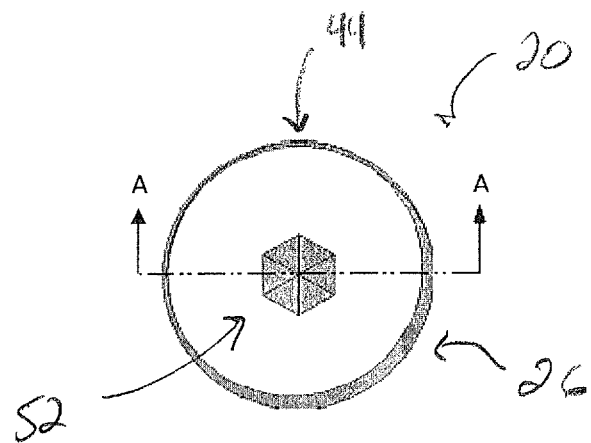
FIG. 4 illustrates a top view of the seal plug of FIG. 2, according to one arrangement.

In one arrangement, the second sealing portion 26 defines a tool engagement portion 52 which provides for interaction with an insertion tool to install or remove the seal plug 20 from the fluid channel. For example, with additional reference to FIG. 4, while the tool engagement portion 52 can be configured in a variety of way, in one arrangement, the tool engagement portion 52 is configured as a hexagonal opening. The hexagonal opening can be accessed by an assembler via a conventional Allen wrench, such as a metric or Imperial Allen wrench.

As provided above, with the inclusion of both the first and second sealing portions 24, 26, the seal plug 20 is configured to provide a substantially secure fluid seal relative to a fluid channel 14. As such, the seal plug 20 can withstand relatively large hydraulic pressures while mitigating leakage of cooling fluid from the cooling assembly 13. Additionally, use of both the first and second sealing portions 24, 26 in a collinear arrangement provides the seal plug 20 with a relatively low height profile. As such, the seal plugs 20 mitigate the use of relatively long plug seals and provides additional space in an injection mold 10 for mold cavities, thereby maximizing the molded part yield per injection mold 10. Further, with inclusion of the channel 34 on the first second sealing portion 24, along with the relative difference in diameters of the first and second sealing portions 24, 26, the seal plug 20 can maintain the o-ring 30 on the first second sealing portion 24 and in contact with the first fluid channel portion 28 of the fluid channel 14 during operation. As such, the seal plug 20 enhances the ability to form a relatively tight fluid seal with the fluid channel 14.

Figure 6:
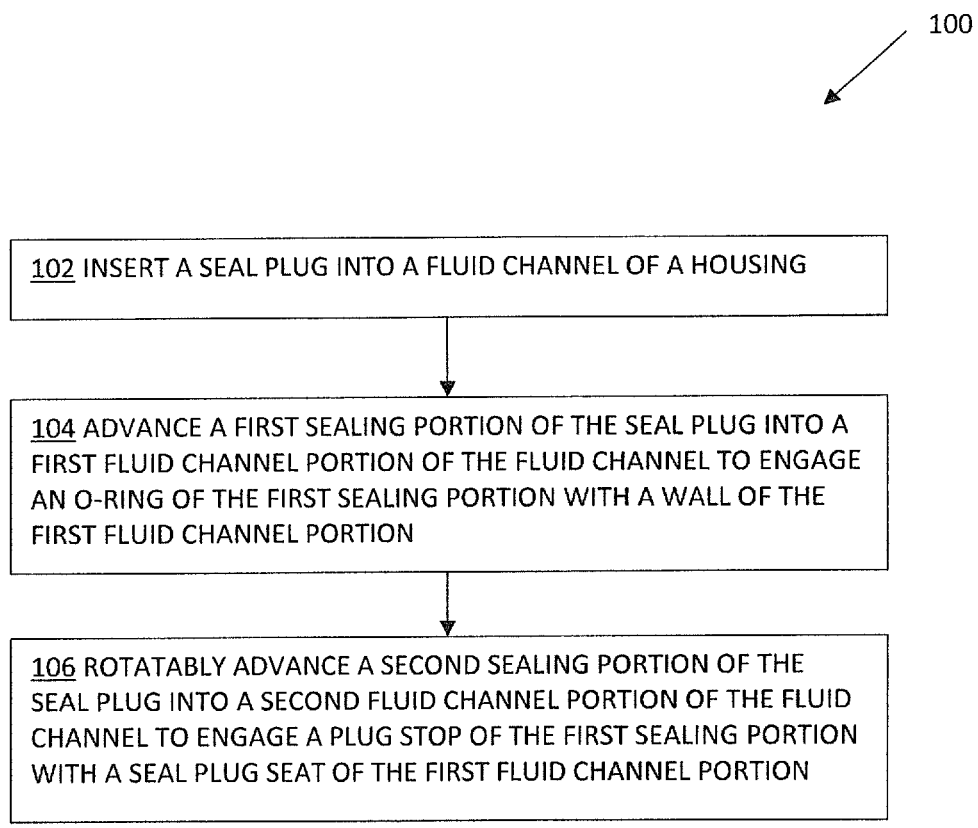
FIG. 6 is a flow diagram illustrating a method of assembly of a cooling assembly, according to one arrangement.

FIG. 6 is a flow diagram 100 illustrating a method of assembly of a cooling assembly, according to one arrangement.

In element 102, an assembler inserts a seal plug 20 into a fluid channel 14 of a housing. For example, with reference to FIG. 5, as an assembler inserts the seal plug 20 into the fluid channel 14, a first sealing portion 24 of the seal plug 20 enters a second fluid channel portion 42 of the fluid channel 14.

Returning to FIG. 6, in element 104, the assembler advances a first sealing portion 24 of the seal plug 20 into a first fluid channel portion 28 of the fluid channel 14 to engage an o-ring 30 of the first sealing portion 24 with a wall of the first fluid channel portion 28. In one arrangement, as the assembler linearly advances the seal plug 20 into the fluid channel 14, the o-ring 30 of the first sealing portion 24 is configured to engage the first fluid channel portion 28 prior to the threads 44 of the second sealing portion 26 engaging the threads formed in the wall of the second fluid channel portion 42.

In element 106, the assembler rotatably advances a second sealing portion 26 of the seal plug 20 into a second fluid channel portion 42 of the fluid channel 14 to engage a plug stop 50 of the first sealing portion 24 with a seal plug seat 52 of the first fluid channel portion 28. For example, as the assembler rotates the seal plug 20 via the tool engagement portion 52, the threads 44 of the second sealing portion 26 engage the treads defined by the second fluid channel portion 42 and advances the first sealing portion 24 within the first fluid channel portion 28. As the plug stop 50 of the first sealing portion 24 contacts the seal plug seat 52 of the first fluid channel portion 28, such interaction limits further advancement of the seal plug 20 within the fluid channel 14, thereby mitigating over tightening of the seal plug 20 and potential damage to the seal plug 20 and/or the fluid channel 14.

Figure 7A:
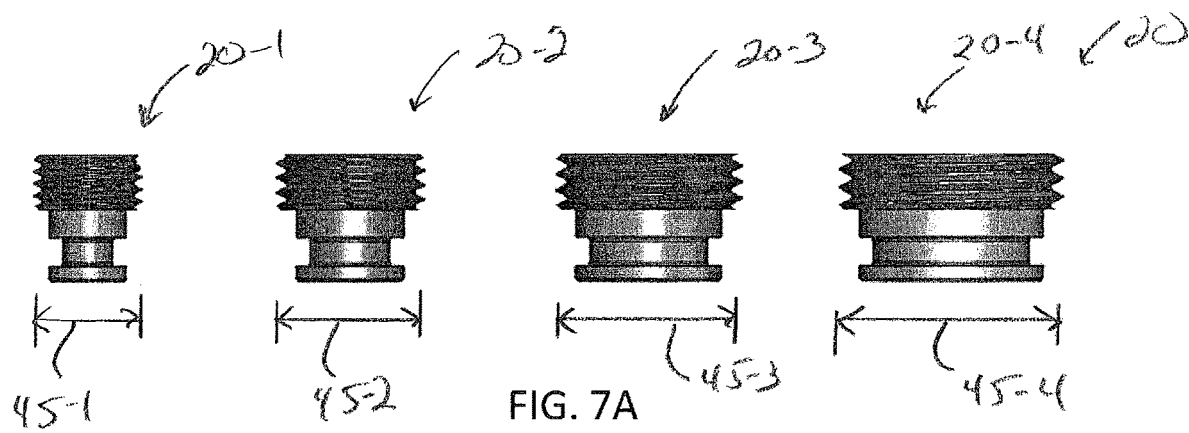
FIG. 7A illustrates a side view of a plurality of seal plugs, each having a corresponding diameter, according to one arrangement.
Figure 7B:
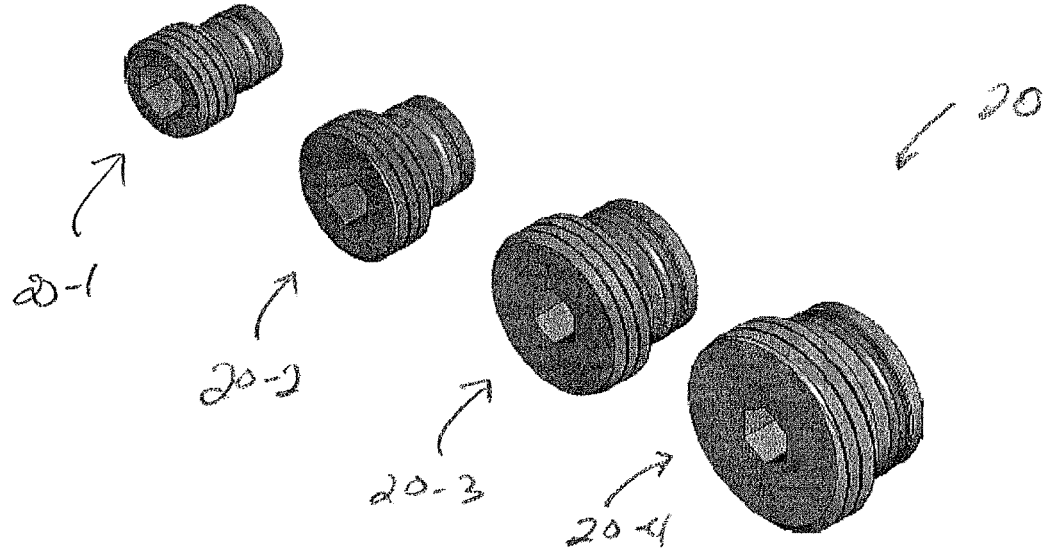
FIG. 7B illustrates a perspective view of the plurality of seal plugs of FIG. 7A, according to one arrangement.

With reference to FIGS. 7A and 7B, the first sealing portion 24 of the seal plug 20 can be configured in a variety of diameters. For example, a first seal plug 20-1 can have a diameter 45-1 of ¼ inches, a second seal plug 20-2 can have a diameter 45-2 of ½ inches, a third seal plug 20-3 can have a diameter 45-3 of ¾ inches, and a fourth seal plug 20-4 can have a diameter 45-4 of ⅝ inches. As indicated, in one arrangement, each of the seal plugs 20-1 through 20-4 is configured with substantially the same height, regardless of the plug diameter. As such, seal plugs 20 having varying diameters can be used with an injection mold 10 while utilizing a minimal volume within the injection mold plates. As such, this configuration maximizes the volume available for injection mold cavities within the injection mold It is noted that the seal plugs 20 are described utilized with a cooling assembly 13 of an injection mold 10. Such description is by way of example only. It should be understood that the seal plugs 20 can be utilized to provide fluid sealing with any type of device. For example, the seal plugs 20 can be utilized with hydraulic devices to maintain hydraulic fluid within hydraulic fluid channels.

While various embodiments of the innovation have been particularly shown and described, it will be understood by those skilled in the art that various changes in form and details may be made therein without departing from the spirit and scope of the innovation as defined by the appended claims.

What is claimed is:

1. A seal plug, comprising:
a plug body having a first sealing portion and a second sealing portion;
an o-ring disposed about a radial outer periphery of the first sealing portion; and
a set of threads disposed about an outer periphery of the second sealing portion, the second sealing portion defining a recessed tool engagement portion;
wherein the radial outer periphery of the first sealing portion defines a channel configured to maintain a longitudinal positioning of the o-ring relative to the plug body.

2. The seal plug of claim 1, wherein an outer diameter of the first sealing portion is less than a major diameter of the set of threads of the second sealing portion.

3. The seal plug of claim 1, wherein an outer diameter of the o-ring is less than a minor diameter of the set of threads of the second sealing portion.

4. The seal plug of claim 1, wherein the first sealing portion defines a plug stop configured to interact with a seal plug seat of a first fluid channel portion.

5. The seal plug of claim 1, wherein the set of threads defined by the second sealing portion are configured as straight threads such that a major diameter of each thread is substantially equal along a longitudinal axis of the seal plug.

6. The seal plug of claim 1, wherein the recessed tool engagement portion of the second sealing portion defines a hexagonal opening.

7. The seal plug of claim 1, wherein the channel defined by the outer periphery of the first sealing portion comprises a first shoulder and a second shoulder opposing the first shoulder, the first shoulder and second shoulder configured to maintain the longitudinal position of the o-ring relative to the first sealing portion.

8. An injection mold, comprising:
a first mold plate having a first set of mold elements;
a second mold plate having a second set of mold elements, the second mold plate opposing the first mold plate; and
a cooling assembly carried by at least one of the first mold plate and the second mold plate, the cooling assembly comprising:
a fluid channel defined by the at least one first mold plate and second mold plate, and
a seal plug disposed within the fluid channel, the seal plug comprising:
a plug body having a first sealing portion and a second sealing portion,
an o-ring disposed about a radial outer periphery of the first sealing portion, and
a set of threads disposed about an outer periphery of the second sealing portion, the second sealing portion defining a recessed tool engagement portion;
wherein the radial outer periphery of the first sealing portion defines a channel configured to maintain a longitudinal positioning of the o-ring relative to the plug body.

9. The injection mold of claim 8, wherein an outer diameter of the first sealing portion is less than a major diameter of the set of threads of the second sealing portion.

10. The injection mold of claim 8, wherein an outer diameter of the o-ring is less than a minor diameter of the set of threads of the second sealing portion.

11. The injection mold of claim 8, wherein the first sealing portion defines a plug stop configured to interact with a seal plug seat of a first fluid channel portion.

12. The injection mold of claim 8, wherein the set of threads defined by the second sealing portion are configured as straight threads such that a major diameter of each thread is substantially equal along a longitudinal axis of the seal plug.

13. The injection mold of claim 8, wherein the recessed tool engagement portion of the second sealing portion defines a hexagonal opening.

14. The injection mold of claim 8, wherein the channel defined by the outer periphery of the first sealing portion comprises a first shoulder and a second shoulder opposing the first shoulder, the first shoulder and second shoulder configured to maintain the longitudinal position of the o-ring relative to the first sealing portion.

15. A method for assembly of a cooling assembly, comprising:
inserting a seal plug into a fluid channel of a housing;
advancing a first sealing portion of the seal plug into a first fluid channel portion of the fluid channel to engage an o-ring of the first sealing portion with a wall of the first fluid channel portion; and
rotatably advancing a second sealing portion of the seal plug into a second fluid channel portion of the fluid channel to engage a plug stop of the first sealing portion with a seal plug seat of the first fluid channel portion, the second sealing portion defining a recessed tool engagement portion;
wherein the o-ring is disposed in a channel defined on a radial outer periphery of the first sealing portion.

* * * * *